Nov. 8, 1927.
S. R. ANDERSON
1,647,978
AIRCRAFT
Original Filed April 16, 1923   5 Sheets-Sheet 1
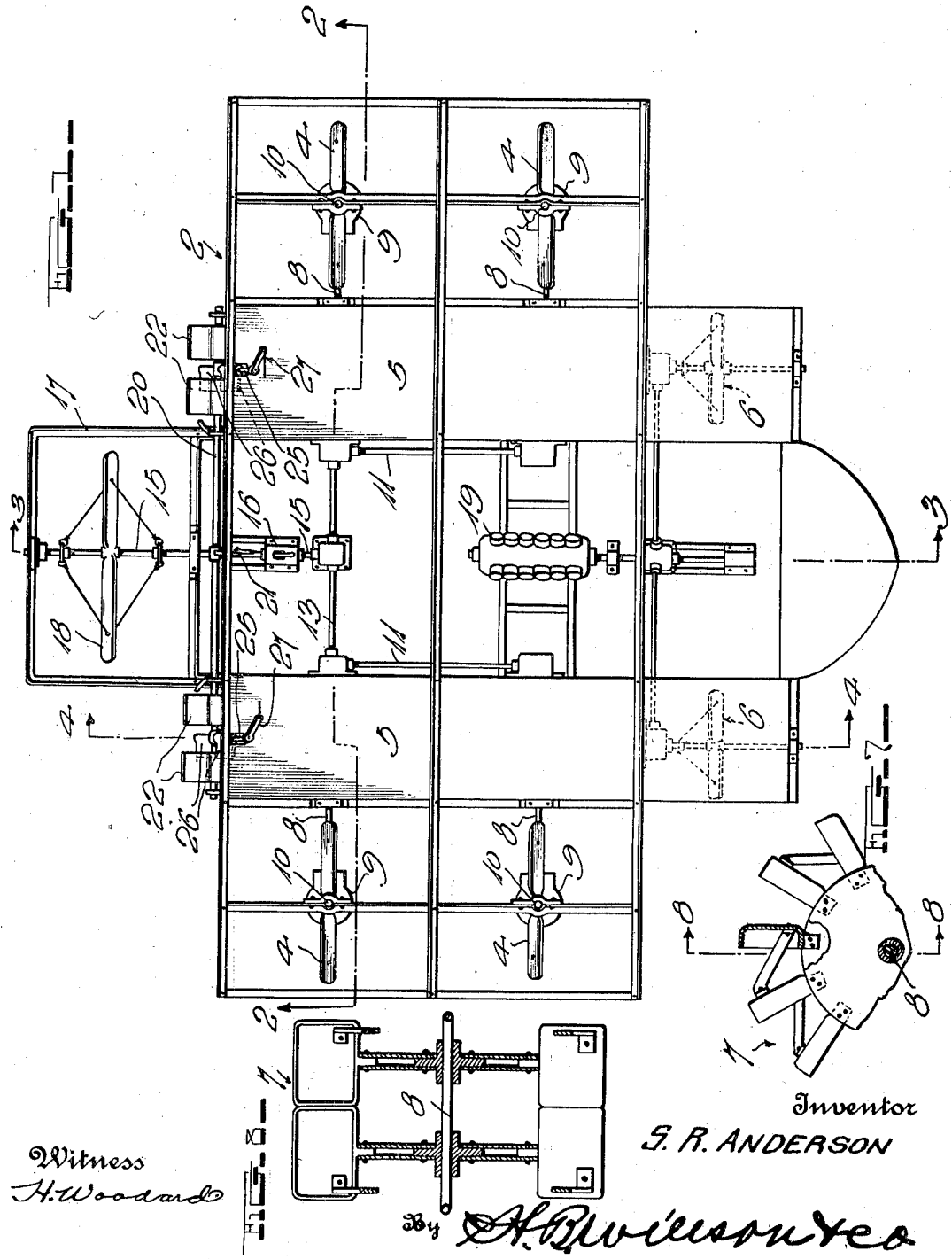
Inventor
S. R. ANDERSON
Witness
H. Woodard
By H. B. Willson & Co.
Attorneys

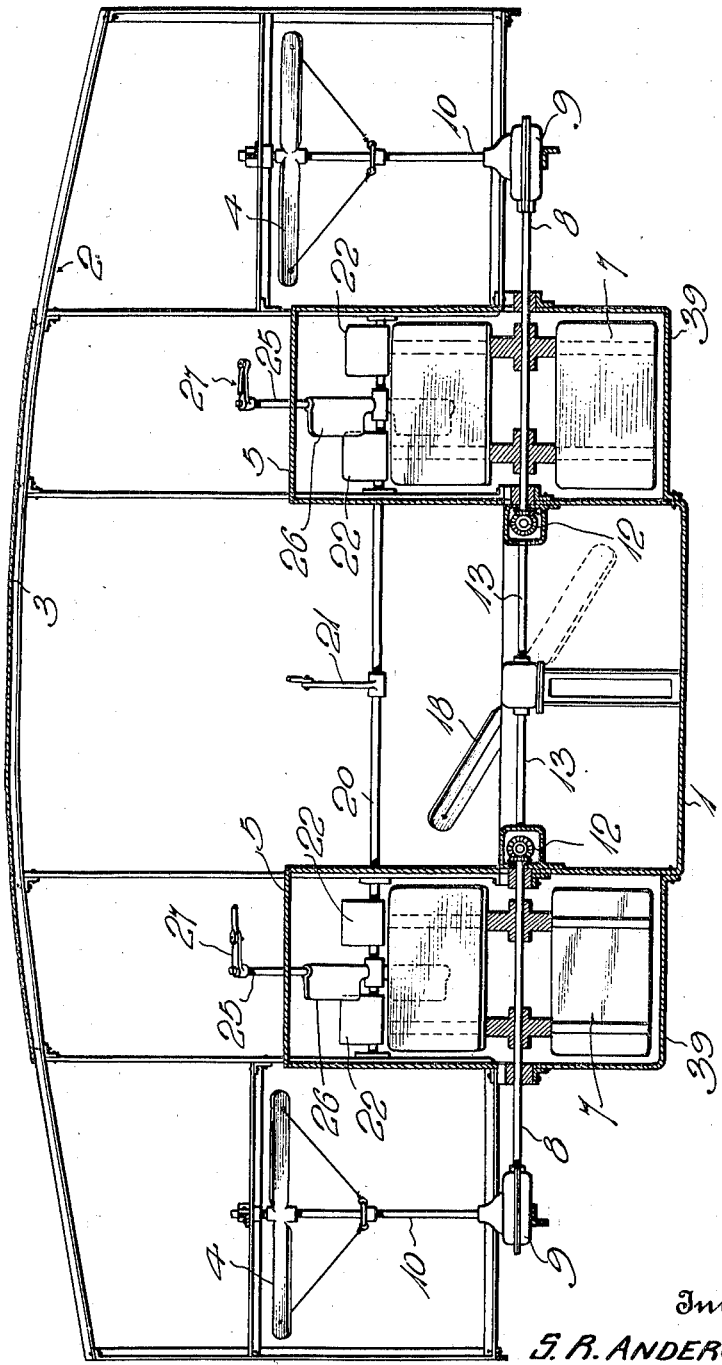

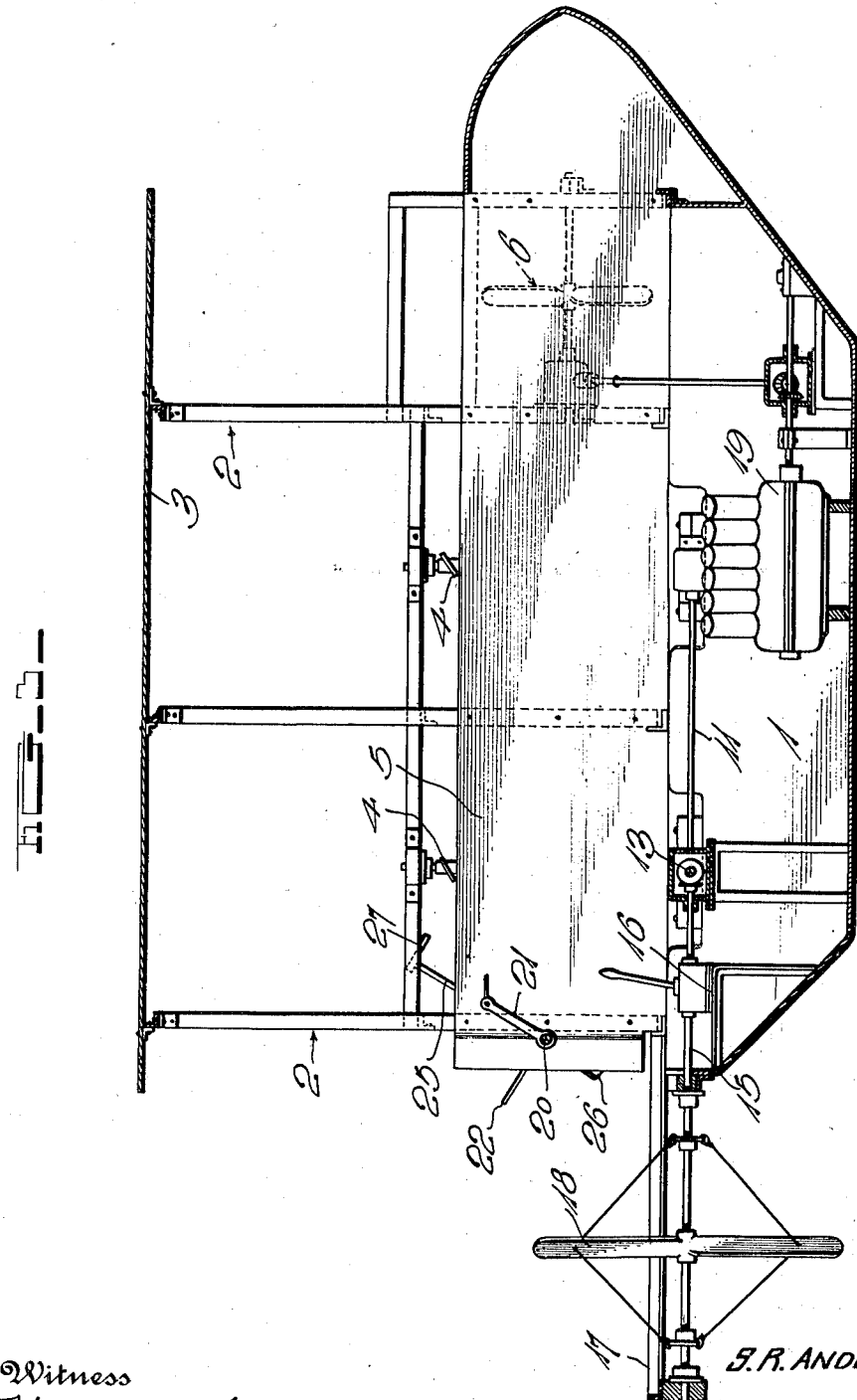

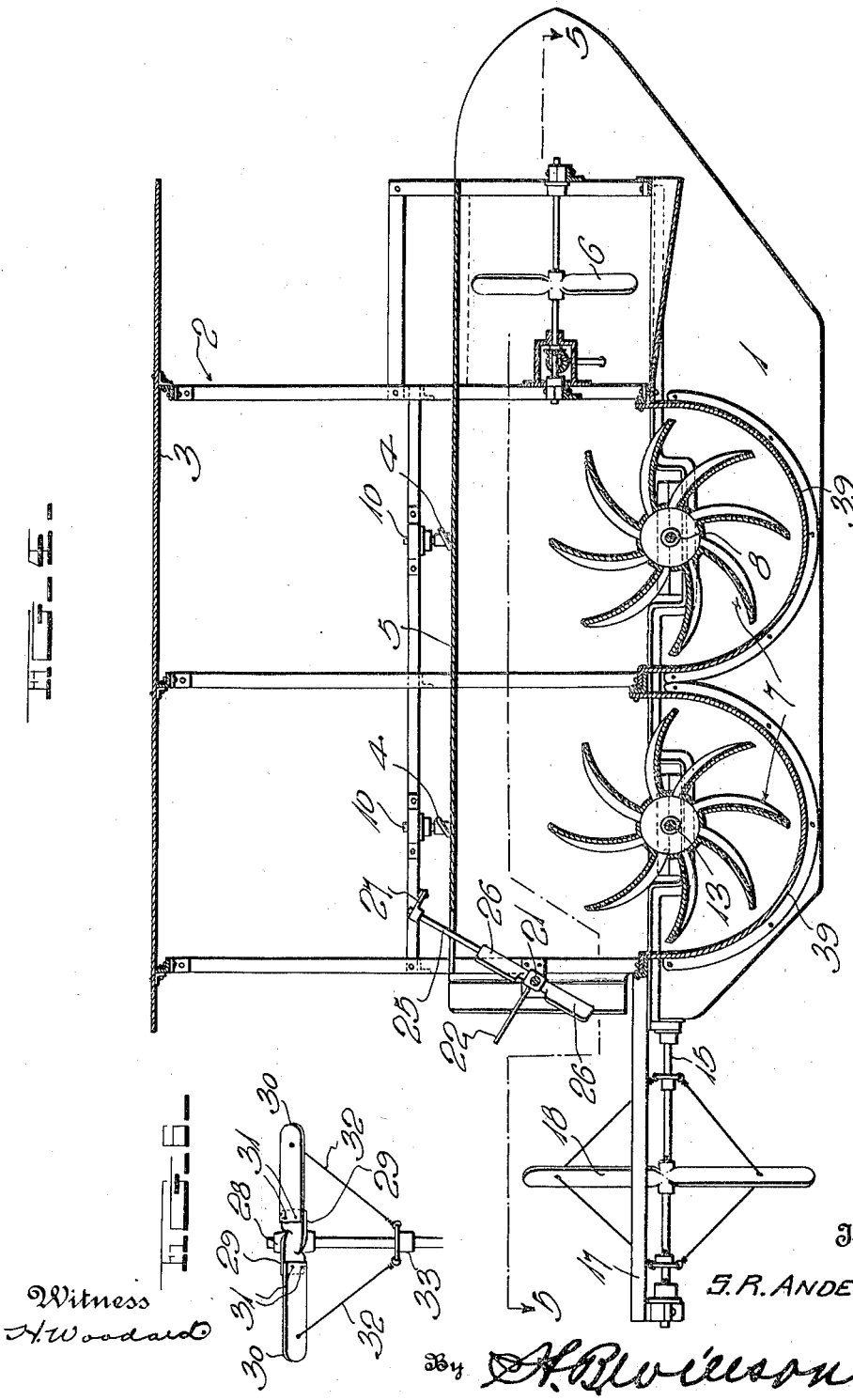

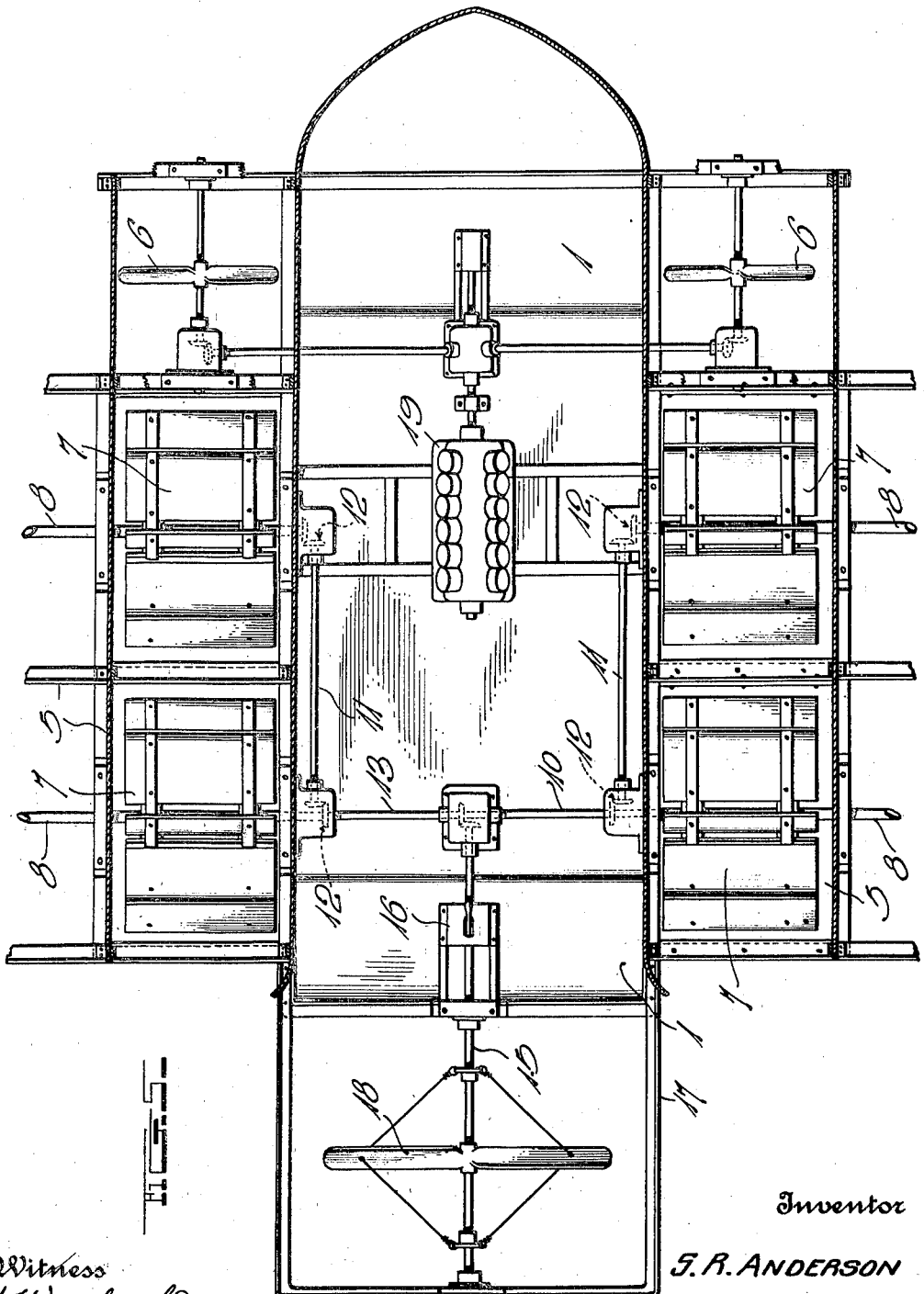

Patented Nov. 8, 1927.

1,647,978

UNITED STATES PATENT OFFICE.

SAMUEL R. ANDERSON, OF ST. LOUIS, MISSOURI.

AIRCRAFT.

Application filed April 16, 1923, Serial No. 632,443. Renewed February 12, 1926.

My invention relates to improvements in aircraft and more particularly to heavier than air machines which are sustained by means other than gas bags.

It is the primary object of my invention to provide an aircraft embodying weight sustaining propelling means and an air motor or a plurality of such motors for driving said weight sustaining means.

A further object is to associate each air motor with a longitudinal tunnel and to provide a motor driven propeller for directing a blast of air through said tunnel for the purpose of efficiently operating the air motor.

Another object is to provide additional propelling means which may be driven either forwardly or reversely, whereby to assist in propelling the machine forwardly or to create a "drag" which will bring the machine to a standstill, with regard to forward travel and will permit it to either move upwardly or downwardly, as occasion may require.

With the foregoing in view, the invention resides in the novel subject matter hereinafter described and claimed, the description being supplemented by the accompanying drawings.

Figure 1 is a top plan view of an aircraft constructed in accordance with my invention, the plane which assists in supporting the machine, being omitted.

Figure 2 is a vertical transverse sectional view as indicated by line 2—2 of Fig. 1.

Figures 3 and 4 are vertical transverse sectional views as indicated by lines 3—3 and 4—4 of Fig. 1.

Figure 5 is a horizontal sectional view taken substantially on the plane of the line 5—5 of Fig. 4.

Figure 6 is a detail side elevation showing the preferred form of propeller.

Figure 7 is a detail side elevation illustrating a different form of air motor from that shown in Fig. 1.

Figure 8 is a sectional view as indicated by line 8—8 of Fig. 7.

In the drawings above briefly described, the numeral 1 designates a central fuselage carried by a suitable frame structure 2 which is preferably elongated transversely of said fuselage, as shown, said frame structure being provided with a plane 3 which terminates short of its right and left ends, in order that it shall not interfere with proper operation of a plurality of weight sustaining propellers or helicopters 4 which are mounted at the ends of the frame and spaced outwardly from the sides of the fuselage 1. Between the weight sustaining propellers 4 and the fuselage, I locate a pair of longitudinal open-ended air tunnels 5 and I provide propellers 6 at the front ends of these tunnels, for forcing strong blasts of air therethrough. Air motors 7 of any desired type are associated with the tunnels 5 in such a manner as to be driven by the air blasts through said tunnels and I employ the movement of these motors 7, for the purpose of operating the weight sustaining propellers 4 and another propeller yet to be described. In the construction shown, the shafts 8 of the air motors 7 extend transversely across the tunnels 5 and have their outer ends connected by appropriate gearing in casings 9, to the lower ends of the vertical shafts 10 of the propellers 4. Longitudinal shafts 11 which may well be located within the fuselage are connected by suitable gearing 12 with the inner ends of the shafts 8 and the rearmost of these shafts 8 are connected by a transverse shaft 13 which is shown extending across the rear end of the fuselage. By appropriate gearing, the shaft 13 drives a longitudinal propeller shaft 15 which contains an appropriate clutch and reverse mechanism 16. The shaft 15 extends rearwardly beyond the fuselage and is supported by an extension 17 of the main frame structure, said shaft being provided with a propeller 18 within the frame extension 17. This propeller 18 is preferably of such a size that it can counterbalance or nullify the action of the two propellers 6, for a purpose to appear. These last named propellers are positively driven by suitable shafting and gearing from a motor 19 which may be located at any desired point.

By the construction described, it will be seen that the propellers 6 will create strong blasts of air through the tunnels 5 and that these blasts will rotate the air motors 7, thus causing rotation of the propellers 4 to lift the weight of the machine while it is being drawn forwardly under the action of said propellers 6. If it is desired to rise vertically, the propeller 18 may be thrown into play and rotated reversely from the propellers 6 to counteract the propelling action of the latter, the result being that as the propellers 4 are then being rapidly driven, the machine will ascend. By properly controlling the several propellers, it will be seen that the machine may be manipulated in any desired manner.

For vertically and horizontally steering the craft, I prefer to provide an arrangement similar to that shown. A horizontal shaft 20 extends over the fuselage 1 and across the rear ends of the tunnels 5, being provided with any suitable means for turning it in either direction, a portion of which means is indicated at 21. At the rear of each tunnel 5, I have shown the shaft 20 provided with a pair of rudders 22 for steering the machine upwardly or downwardly. Between these rudders, a vertical shaft 25 extends across and is carried by the shaft 20, said shaft 25 having appropriate rudders 26 to effect horizontal steering. One shaft 25 is located at the rear end of each tunnel 5 and these shafts may be connected by any preferred means such as that indicated at 27, for simultaneously turning both of them in the required direction.

Each of the propellers is preferably of the form shown in Fig. 6, in which the numeral 28 designates a hub having integral pitched flanges 29 to which a pair of pitched blades 30 are secured by rivets or the like 31. These blades may be formed of very thin light metal and in order to prevent possible bending thereof, I prefer to connect them, by means of diverging brace wires or cables 32, to a collar 33 secured on the propeller shaft.

When the air motors 7 are of the form shown in most of the views, or of the bucket type illustrated in Figs. 7 and 8, it is necessary that only about one-half of their circumference shall be exposed in the tunnels 5. Hence, these tunnels are provided with lateral offsets 39 receiving the remainder of said motors.

By employing the construction shown or a substantial equivalent thereof, an aircraft is provided which will be very desirable in a number of ways, particular attention being directed to the fact that the air motors 7, regardless of the form which they may assume, will drive the weight sustaining propellers 4 and if desired, the propeller 18, whether the machine is being driven under power or merely drifting or gliding. It will be seen that when gliding at high speed, the blasts of air passing through the tunnels 5 will be sufficient to perform the desired work, even though the propellers 6 are not then in operation.

It is to be understood that the present disclosure of the invention is principally for illustrative purposes and that within the scope of the invention as claimed, numerous changes may be made.

I claim:

1. An aircraft having a motor driven propeller, weight sustaining means for the machine, means for driving said weight sustaining means including an air motor behind said propeller and driven by the air blast therefrom, an additional propeller for the craft, and means driven by said air motor for driving said second propeller in either direction.

2. An aircraft having a longitudinal air tunnel, a motor driven propeller for directing a blast of air through said tunnel, an air motor driven by the blast of air through said tunnel, weight sustaining means for the craft driven by said air motor, an additional propeller for the craft, and means for driving said additional propeller in either direction from said air motor.

3. An aircraft comprising a fuselage, a pair of longitudinal tunnels disposed one at each side of said fuselage, weight sustaining propellers at opposite sides of said fuselage, a pair of motor driven propellers for creating rearward blasts of air through said tunnels, additional propelling means independent of said tunnels, air motors associated with said tunnels and driven by the blasts of air therethrough, and driving means connecting said weight sustaining propellers and said additional propelling means with said air motors, including a reverse gear for said additional propelling means.

4. An aircraft having a motor driven propeller, weight sustaining means for the machine, and means for driving said weight sustaining means including an air motor behind said propeller driven by the blast of air therefrom.

5. An aircraft having a longitudinal air tunnel, a motor driven propeller for creating a blast of air through said tunnel, weight sustaining means for the machine, and driving means for said weight sustaining means including an air motor driven by the blast of air through said tunnel.

In testimony whereof I have hereunto affixed my signature.

SAMUEL R. ANDERSON.